United States Patent [19]

Gross et al.

[11] Patent Number: 4,656,332

[45] Date of Patent: Apr. 7, 1987

[54] USE OF THE LASER WELDING PROCESS FOR AND METHOD OF MANUFACTURING OF WELDED CONSTRUCTION PARTS FOR EXHAUST INSTALLATIONS

[75] Inventors: Heinz Gross, Dortmund; Manfred Gerber; Rolf Krebs, both of Hamm; Friedhelm Retzlaff, Kamen-Methler, all of Fed. Rep. of Germany

[73] Assignee: Hoesch Aktiengesellschaft, Eberhardstrasse, Fed. Rep. of Germany

[21] Appl. No.: 803,399

[22] Filed: Dec. 2, 1985

[30] Foreign Application Priority Data

Dec. 19, 1984 [DE] Fed. Rep. of Germany ....... 3446280

[51] Int. Cl.$^4$ .............................................. B23K 26/00
[52] U.S. Cl. .............................................. 219/121 LD
[58] Field of Search ................. 219/121 LC, 121 LD, 219/121 EC, 121 ED, 121 L, 121 LM, 121 EB, 121 EM

[56] References Cited

U.S. PATENT DOCUMENTS 4,315,132 2/1982 Saurin et al. ............. 219/121 LC X

FOREIGN PATENT DOCUMENTS 0094346 11/1983 European Pat. Off. .

*Primary Examiner*—C. L. Albritton

[57] ABSTRACT

A laser welding process is used according to the invention for the manufacture of a straight seam weld for tubular construction parts of ferritic, Ti-stabilized CR steel x5CrTi12 for exhaust systems in automobiles. This has the advantage that after welding the construction parts can be expanded or compressed by more than 40% of their original dimensions.

6 Claims, 3 Drawing Figures

USE OF THE LASER WELDING PROCESS FOR AND METHOD OF MANUFACTURING OF WELDED CONSTRUCTION PARTS FOR EXHAUST INSTALLATIONS

BACKGROUND OF INVENTION

The invention relates to the use of laser-welding for and a method of manufacturing by welding with a straight bead, tubular construction parts for exhaust installation, in particular in automobiles with exhaust catalyzer from austenitic or ferritic CR-steel.

It is known in the prior art to manufacture tubular construction units for such a use, and especially for exhaust pipes which are susceptible to scale formation and corrosion up to the pre or main damper from the material X5CrTi12 which is a relatively low-cost substance for this purpose. The tubular units are welded with a straight bead by WIG-welding or high frequency resistance pressure welding (H.F.) Both methods have considerable shortcomings.

After welding, the bead expansion must be removed by scraping or grinding, to an extent not detrimental to the tube shaping steps, resulting from which, for example, cold bending, flanging expanding. At wall thicknesses of 0.8–2.5 mm and tube diameters of 30 to 65 mm technical problems can arise in case of HF-welding by interior weld removal or unintentional removal which goes too deep, leading to groove fissures. It is also possible that in case of HF-welding the corresponding oxides are not completely removed and a sporadic cold welding caused by the working material can hardly be avoided. Such shortcomings in the center of the weld lead to breaking open of the weld after subsequent treatment of the tubes, like expanding or bending. This results in the production of too many low quality parts and of waste. Similar problems arise in WIG-welded tubes due to the large-grained wide structure of welding material, which structure allows only an insignificant degree of reshaping. It is difficult to attain through-welding at the inside. Due to this outside inside effect only small reshaping is possible upon reshaping during processing of the tubes.

In connection with the development of ceramics-lines motors with hotter exhaust gases it makes sense to manufacture the exhaust installations from two-layer materials, which have for example an outer layer of ferritic and an inner layer of austenitic material.

SUMMARY OF THE INVENTION

It is an object of the invention to propose a joining process for tubular construction units of the material X5CrTi12 and other suitable material, which makes good use of the advantages of known joining processes, economical welding speed of HF-welding, good melting-welding of noble steel by the WIG-method, and allows the possibility to process the construction units subsequently to high shaving-less reshaping while avoiding additional welding materials or other expensive alloy metals.

Attaining the object results from the surprising fact that the reforming capability of the construction parts, the width of the weld, cleanliness of the weld and general weld quality, e.g. the complete through welding and the structure of the weld are factors of great importance.

This can be achieved by radiation welding at a preset speed. In this connection electronic radiation welding had to be excluded because of problems with vacuum or near vacuum creation for continuous welding at high speed.

EP-A3-0094346 teaches the discontinuous laser welding of can bodies. There are, however, no references as to how in a continuous process the geometry of the welds, bearing pressure or the like in case of the present working material have to be chosen.

The practically pressure-less welding of the band edges in combination with high welding speed leads to very small weld expansion, weld widths and a very good through welding if there is a corresponding variation of the focal point.

This has the additional desirable effect that no burr removal is required and losses of material of 1–2% are avoided.

In the course of developing ceramics-lined motors, it is advisable to manufacture the exhaust installations of two-layer materials, which have for example, an outer layer V of austenitic material. Construction units welded according to the invention can be reshaped without problem for example, they can be expanded or compressed by more than 40% of their original dimensions, with the weld not impeding the reshaping.

DESCRIPTION OF PREFERRED EMBODIMENTS

Figure 1:
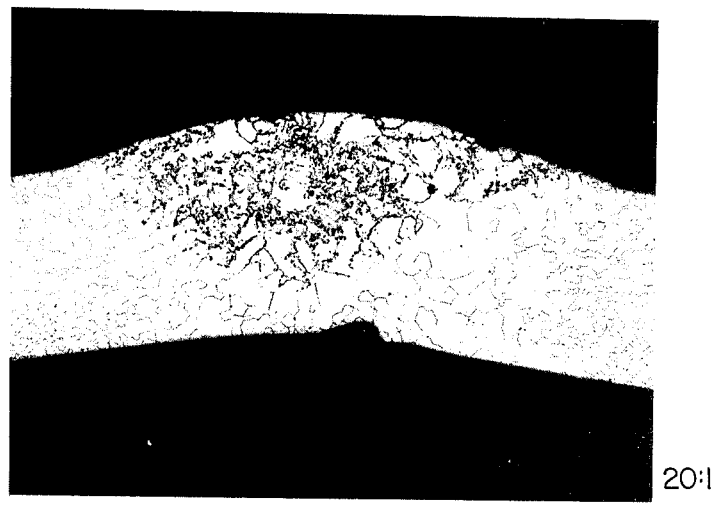
FIG. 1 is a micrograph showing a WIG-weld, welded with additional material, tube wall thickness 1.5 mm, weld expansion at the outside 0.3 mm according to the state of the art.

In the heat-influenced weld-zone in FIG. 1, a coarse structure is clearly visible. At the inside there is an incomplete through welding, connected with groove fissures, which is, in particular, detrimental to an expansion of the tubes.

Figure 2:
FIG. 2 is a micrograph showing an HF-weld according to the state of the art, scraped at the outside, tube wall thickness 1.4 mm.

In FIG. 2, the outer weld is slightly underscraped; the inner weld expansion leads to faults after deforming (groove fissures next to the weld).

Figure 3:
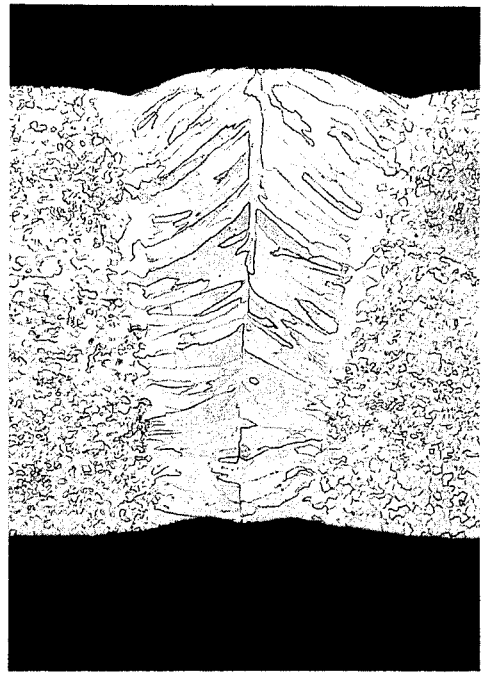
FIG. 3 is a micrograph showing laser-welded weld attained according to the invention.

In FIG. 3, the weld is in a tube produced from a steel band of 1.5 mm thickness and a width of 142 mm. The material is DIN 1.4512 with 0.03 C; 0.54% Si; 0.32% Mn; 11.3% Cr, 0.28% Ti, 0.022% P; 0.008% S; 0.015% Ni. FE remainder and unavoidable impurities.

After continuous shaping into a split tube, it is led below a CO2-laser welding apparatus and is welded to become a tube with a diameter of 45 mm. The bearing pressure before the welding point is set at about 0.08N/mm. The welding speed is 8 m/min; the weld width 0.9 mm; the weld expansion at the outsided is 0.1 mm (FIG. 3).

The tube is cooled with an emulsion and cut into individual lengths of 8 m. One tube section was expanded and reached an expansion of 90%.

Another tube was processed to become a twice-bent elbow. Bending was done in two planes vertically to the tube axis by 180 degrees each. The bending radius was 1.5 times the tube diameter.

In all reshaping there was no waste creation by weld cracks or pores.

The tubes manufactured according to the invention can be advantageously processed to become exhaust pipes for automobiles.

What is claimed is:

1. Use of the laser welding process for manufacturing tubular construction units with a straight bead for exhaust installations with a welding seam 0.8 times smaller and a weld expansion 0.2 times smaller than the thickness of the tube wall, which construction units are subsequently subjected to critical changes of shape and which are corrosion- and heat-proof, said units being manufactured at a welding speed greater than 5 m/min, with the band edges being pressed together at the maximum $0.1 N/mm^2$, and austenitic or ferritic CR-steel being used as working material.

2. Use of the laser welding process according to claim 1, while the working material is X5CrTi12 with $C \leq 0.08\%$, $Si \leq 1.0\%$, $Mn \leq 1.0\%$, Cr 10.5 to 12.5%, Ti>6 times C%, however with a maximum of 1.0%; $P \leq 0.45\%$, $S \leq 0.03\%$, $Ni \leq 0.5\%$ remainder Fe and unavoidable impurities.

3. Use of the laser welding process according to claim 1 with two layer steel working materials.

4. Method of manufacturing tubular construction parts for exhaust installations, welded with a straight bead out of ferritic Ti-stabilized Cr-steel X5CrTi12, characterized in that a split tube formed from a band is continuously laser-welded at welding speeds greater than 5 m/min, with a seam 0.8 times smaller and a weld expansion 0.2 times smaller than the band thickness and in that the band edges are pressed together at a maximum of $0.1 N/mm^2$ before the welding point.

5. Method according to claim 4, characterized in that portions of the tube-shaped construction unit in which the welding seam is also contained, are more than 40% expanded or compressed relative to their original size after cold welding.

6. Method according to claim 4, characterized in that the tubular construction unit is so strongly bent that the central bending radii lie below two times the tube diameter.

* * * * *